(12) United States Patent
Parks et al.

(10) Patent No.: US 12,673,771 B2
(45) Date of Patent: Jul. 7, 2026

(54) DOORWAY SIDE GUIDE SYSTEM

(71) Applicant: Textron Aviation Inc., Wichita, KS (US)

(72) Inventors: Brandon Lynn Parks, Andale, KS (US); David Grant Pulen, Valley Center, KS (US); Jason Roger Purdy, Wichita, KS (US); Edward Moradians, Azusa, CA (US)

(73) Assignee: Textron Aviation Inc., Providence, RI (US)

( * ) Notice: Subject to any disclaimer, the term of this patent is extended or adjusted under 35 U.S.C. 154(b) by 398 days.

(21) Appl. No.: 18/360,900

(22) Filed: Jul. 28, 2023

(65) Prior Publication Data

US 2024/0034470 A1     Feb. 1, 2024

Related U.S. Application Data

(60) Provisional application No. 63/369,832, filed on Jul. 29, 2022, provisional application No. 63/369,730, filed on Jul. 28, 2022.

(51) Int. Cl.
  B64D 9/00     (2006.01)
  B64C 1/14     (2006.01)
(52) U.S. Cl.
  CPC ............ B64D 9/003 (2013.01); B64C 1/1407 (2013.01)
(58) Field of Classification Search
  CPC .... B64D 9/003; B64D 9/00; B64D 2009/006; B64C 1/20; B64C 1/1407; B60P 7/0815; B61D 17/06; B61D 19/00

USPC .......................................................... 410/52
See application file for complete search history.

(56) References Cited

U.S. PATENT DOCUMENTS

| | | |
|---|---|---|
| 3,698,679 A | 10/1972 | Lang et al. |
| 3,964,223 A | 6/1976 | Sato et al. |
| 4,470,566 A | 9/1984 | Fitzgerald |
| 4,473,201 A | 9/1984 | Barnes et al. |
| 4,886,413 A | 12/1989 | Leon |
| 5,312,071 A | 5/1994 | Eilenstein-Wiegmann et al. |
| 5,518,207 A | 5/1996 | Nordstrom et al. |
| 5,738,199 A | 4/1998 | Moradians |
| 7,429,157 B2 | 9/2008 | Schulze et al. |
| 7,665,938 B2 | 2/2010 | Schulze |

(Continued)

OTHER PUBLICATIONS

A330F Main Deck cargo loading FM25DAT13S00001.WMV; youtube.com video; youtube.com/watch?v=iajqm_wFJ2g; poor student for the video; accessed Oct. 28, 2025; published Sep. 22, 2011. (Year: 2011).*

(Continued)

*Primary Examiner* — Amy R Weisberg
*Assistant Examiner* — Philip C Adams
(74) *Attorney, Agent, or Firm* — Avek IP, LLC

(57) ABSTRACT

A doorway side guide system includes a base mechanically coupled with a bottom portion of a doorway. A mounting member is rotatably coupled to the base via a hinge for rotating between a deployed position and a stowed position. A contact member is mechanically coupled with the mounting member via a pivot such that the contact member is configured to rotate about the pivot. The contact member extends outside of the doorway in the deployed position for guiding cargo through the doorway and for protecting a doorframe of the doorway.

12 Claims, 8 Drawing Sheets

(56) References Cited

U.S. PATENT DOCUMENTS

2016/0001870 A1    1/2016   Moradians et al.
2022/0161917 A1    5/2022   Chalons et al.

OTHER PUBLICATIONS

Aircraft Owner's & Operator's Guide: 757 Family, Aircraft Commerce, Oct./Nov. 2005, 19 pages, Issue No. 43.

FedEx 757 marks first for FedEx, National Airport, Jul. 27, 2008, American Shipper, 2 pages, retrieved from the Internet on Oct. 4, 2024, https://www.freightwaves.com/news/fedex-757-marks-first-for-fedex-national-airport.

Photograph taken of side guide in an aircraft cargo system on a conversion variant of a Boeing 757 made publicly available at least by 2008.

Main Cargo Door (MCD) Sill Protector Conversion (B727-200F), MCD Sill Protector Conversion Study, Jan. 2, 2011, 4 pages, retrieved from the Internet on Oct. 2, 2024, https://aircraft-support.blogspot.com/2011/01/main-cargo-door-mcd-sill-protector.html.

* cited by examiner

DOORWAY SIDE GUIDE SYSTEM

CROSS-REFERENCE TO RELATED APPLICATIONS

This application claims the benefit of priority of U.S. Provisional Patent Application No. 63/369,730, entitled Doorway Side Guide System and filed on Jul. 28, 2022, and U.S. Provisional Patent Application No. 63/369,832, entitled Door Sill Protector and filed on Jul. 29, 2022, the disclosures of which are both herein incorporated by reference in their entirety.

BACKGROUND

1. Field

Embodiments described herein relate generally to cargo loading systems, and more specifically to a guide system installed on the sides of a cargo door of an aircraft.

2. Related Art

Door guide and protection systems for cargo aircraft are known. For example, U.S. Pat. No. 7,665,938 to Schulze discloses a dual guide and restraint device for use in an aircraft cargo bay.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the invention will be apparent from the following detailed description of the embodiments and the accompanying drawing figures.

In an embodiment, a doorway side guide system includes: a base mechanically coupled with a bottom portion of a doorway; a mounting member rotatably coupled to the base via a hinge for rotating between a deployed position and a stowed position; and a contact member mechanically coupled with the mounting member via a pivot, the contact member being configured to rotate about the pivot, wherein the contact member extends outside of the doorway in the deployed position for guiding cargo through the doorway and for protecting a doorframe of the doorway.

In another embodiment, a doorway side guide system includes: a base fastened to a bottom portion of a doorway; a mounting member rotatably coupled to the base via a hinge; a contact member rotatably coupled with the mounting member via a pivot; a catch configured to secure the mounting member against the base in a stowed orientation; and a biasing member disposed on the hinge to bias the mounting member into a deployed orientation upon release of the contact member, wherein the contact member extends outside of the doorway in the deployed orientation for guiding cargo through the doorway and for protecting a doorframe of the doorway.

BRIEF DESCRIPTION OF THE DRAWINGS

Embodiments of the invention are described in detail below with reference to the attached drawing figures, wherein.

Figure 1:
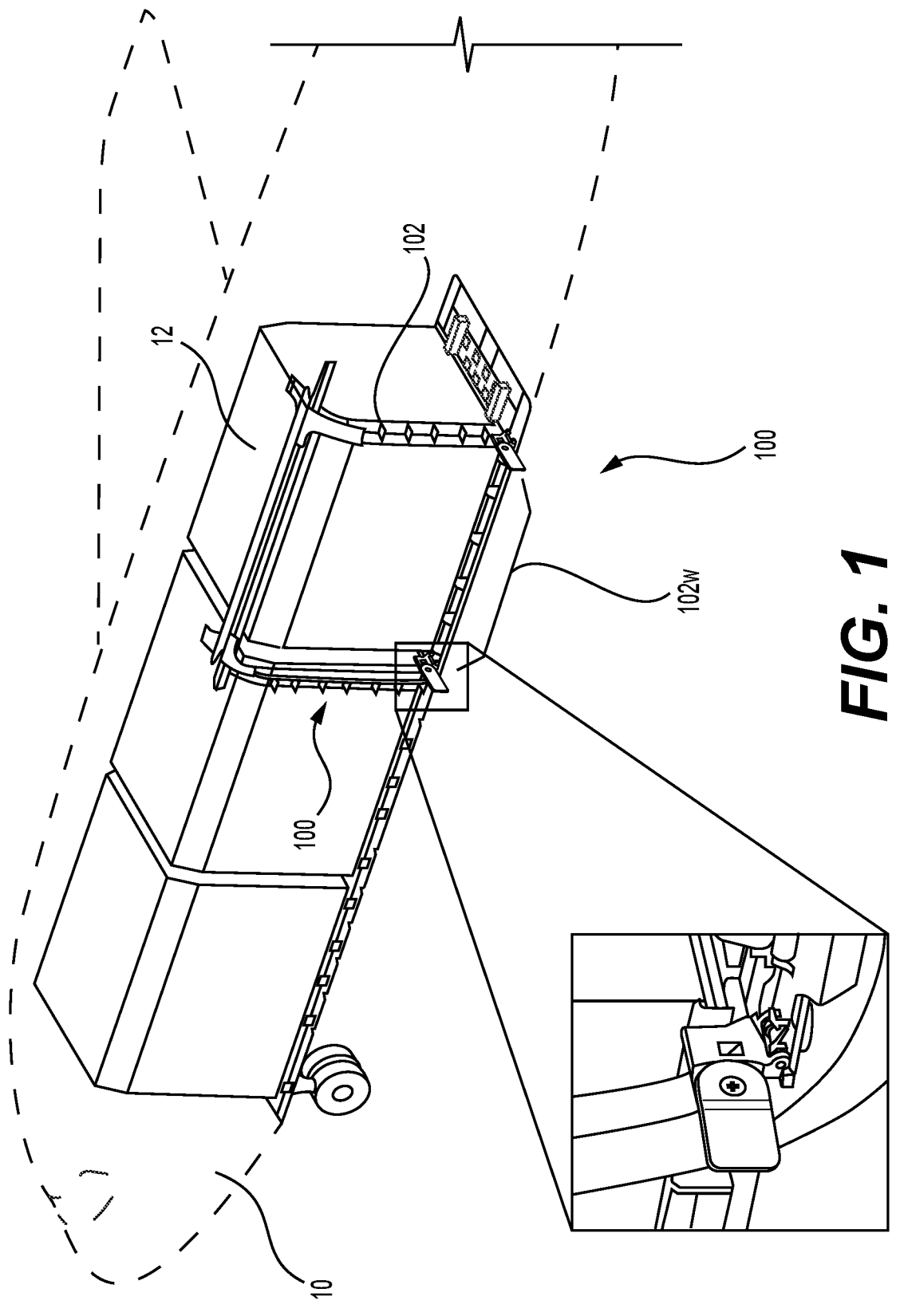
FIG. 1 shows an exemplary cargo door for use with a doorway side guide system.

The drawing figures do not limit the invention to the specific embodiments disclosed and described herein. The drawings are not necessarily to scale, emphasis instead being placed upon clearly illustrating the principles of the invention.

DETAILED DESCRIPTION

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized, and changes can be made without departing from the scope of the invention. The following detailed description is, therefore, not to be taken in a limiting sense. The scope of the invention is defined only by the appended claims, along with the full scope of the equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the technology can include a variety of combinations and/or integrations of the embodiments described herein.

During airplane cargo loading operations, cargo containers are loaded through a door opening in the side of an airplane fuselage. The process involves the use of cargo loading equipment, which operates nearby and interfaces with components of the airplane such as the doorframe structure. Consequently, precautions should be taken to ensure that damage to the airplane does not occur due to inadvertent contact between the loading equipment or cargo containers and the airplane.

In air transport, the process of loading cargo onto an airplane presents challenges. Cargo containers lifted from a truck, for example, to a cargo door on an airplane must fit within the aircraft doors, which are often restricted in size due to aircraft size and weight constraints. Consequently, aircraft doors may be only slightly larger than conventional cargo containers. For example, some aircraft cargo doors are only about six inches wider than typical cargo containers, leaving only about three inches of clearance per side. As a result, any misalignment of cargo during loading presents the possibility of damage to the aircraft doorframe.

Embodiments described herein include a side guide device installed on each side of an aircraft doorway that extends outward from a doorframe and serves as both a guide through the doorframe and a protector of the doorframe. During loading procedures, the side guides may help guide a misaligned or runaway container through the doorframe, and damage to the doorframe may be prevented. Because the side guides extend outwardly from the doorframe when in use, a cargo container or its loading equipment contacts the side guides before contacting the doorframe. Each side guide comprises a mounting member, a base, and a contact member. The mounting member is used to attach the side guide on or near the base of a doorframe, the base is coupled to the mounting member via a hinge to allow the mounting member to be rotated between a deployed and stowed position, and the contact member is coupled to the base on a pivot with a spring-loaded joint. The contact member extends substantially outside of the doorframe to provide a point of contact for guiding any misaligned or runaway cargo at a safe distance away from the doorframe, and the spring-loaded joint allows the contact member to rotate up and down if it is contacted by cargo loading equipment. Contact between a side guide and a cargo item not only hinders potential damage to an aircraft but also indicates to operators that cargo being loaded onto the aircraft is not positioned correctly to fit within the doorframe or is otherwise moving in a way that may damage the aircraft given continued movement, allowing the operators to stop and re-orient the cargo before further loading.

Referring now to FIG. 1, embodiment aircraft 10 comprises a doorway 100 into which cargo 12 may be loaded. Doorway 100 comprises a doorframe 102 having a width 102*w*. Width 102*w* represents an internal width of the opening of doorframe 102. Cargo 12 has a width less than width 102*w* to enable cargo 12 to be moved safely through doorframe 102. Similarly, cargo 12 has a height that is less than an interior opening height of doorframe 102 such that cargo 12 may safely pass through doorframe 102 while being loaded on or off aircraft 10. For example, width 102*w* is configured to exceed the width of cargo 12 by about six inches. While loading, cargo 12 is positioned within the bounds of width 102*w* to prevent damage to doorframe 102. If cargo 12 is not positioned within the bounds of width 102*w*, then cargo 12 is considered misaligned.

Figure 2A:
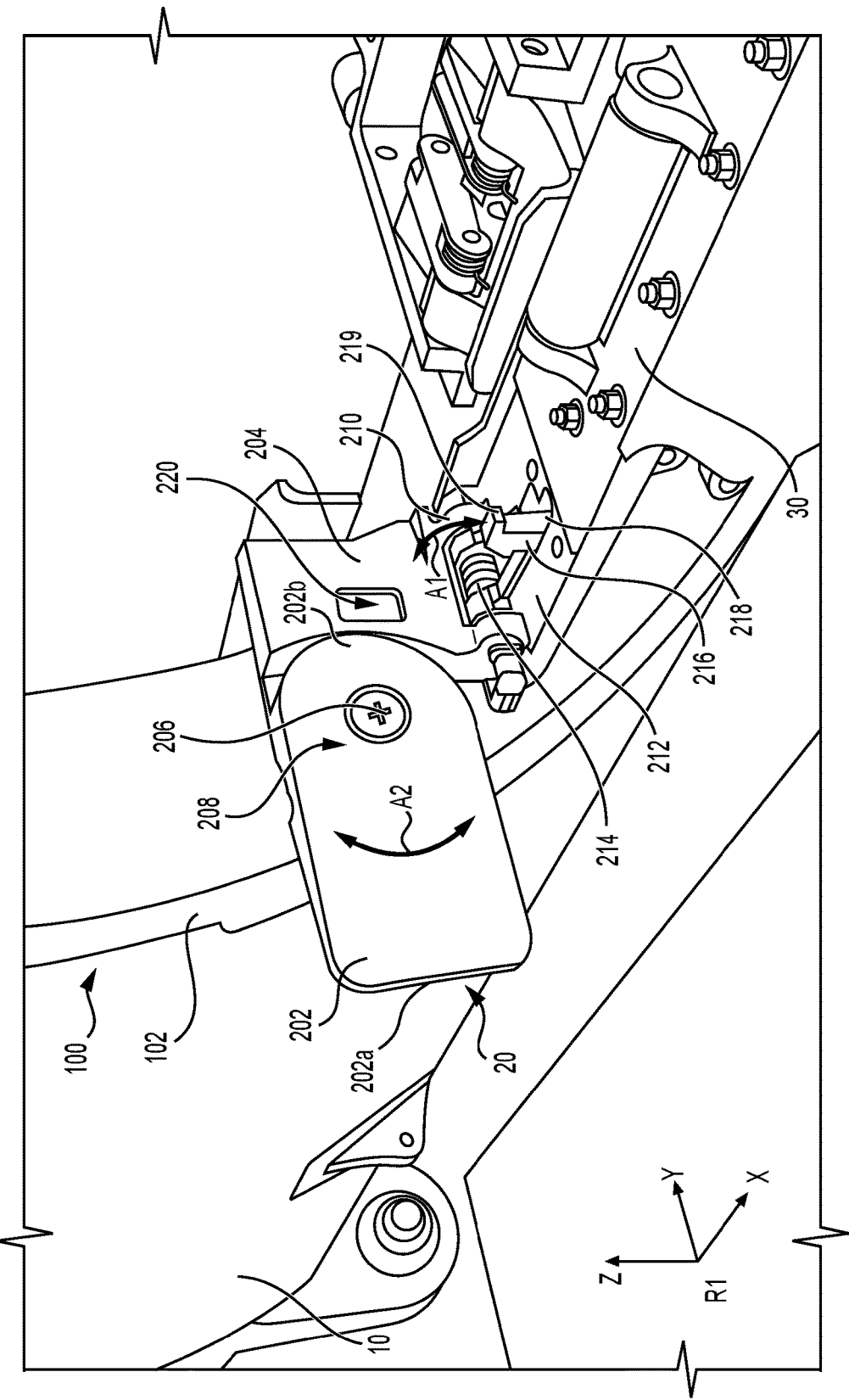
FIG. 2A shows a side guide in a deployed position, in an embodiment.

FIGS. 2A-2E show side guide 20 attached to doorframe 102 within doorway 100. FIGS. 2A-2E are best viewed together with the following description. Coordinate reference R1 is shown in FIG. 2A to represent the following directions: the Z-direction is normal to the ground that aircraft 10 rests on, the X-direction is parallel to the longitudinal axis of aircraft 10, and the Y-direction is parallel to the transverse axis of aircraft 10. Any cargo 12 that is to be loaded onto aircraft 10 must be raised to the correct height in the Z-direction before being translated along the Y-direction through doorway 100. Also prior to loading cargo through doorway 100, translation of cargo 12 occurs in the X-direction for aligning cargo 12 with doorway 100.

A first side guide 20 is disposed at the bottom of doorframe 102 on a first side of doorway 100, and a second side guide 20 (not shown) is disposed at the doorframe 102 on the opposite side of the first side guide 20. First and second side guides 20 are configured to face each other on opposing sides of doorway 100 and be installed within doorframe 102 along a bottom portion of doorway 100. A width between first and second side guides 20 is therefore less than width 102*w* of doorframe 102.

Each side guide 20 comprises a contact member 202, a mounting member 204, and a base 212. Contact member 202 has a first end 202*a* extending outwards from doorway 100 and a second end 202*b* opposite the first end. In embodiments, contact member 202 may have a tapered thickness, where the first end 202*a* is thinner. Base 212 is mechanically coupled to a portion of the doorway 100 such as the doorframe 102 via one or more fasteners, such as screws, bolts, rivets, or other means. In embodiments, base 212 is mechanically coupled to a door sill extension 30, as depicted in FIGS. 2A-2E. Door sill extension 30 is disposed along the bottom of doorframe 102 to cover the door sill of doorway 100. By extending outwards when deployed, door sill extension 30 disposes side guide 20 at a more outwardly position within doorway 100. However, side guide 20 may be mounted directly to doorframe 102, the floor of aircraft 10, or in any other position without departing from the scope hereof. Preferably, side guide 20 extends substantially outside of doorway 100 when deployed.

Mounting member 204 is rotatably coupled to base 212 via a hinge 210. A mounting member biasing member 214 biases mounting member 204 into a substantially upright position for deployment, such that mounting member 204 is perpendicular to base 212 as shown in FIGS. 2A, 2B, 2D, and 2E. Mounting member biasing member 214 may comprise a torsion spring disposed on hinge 210, for example. Mounting member 204 may be rotated about hinge 210 to move side guide 20 between a stowed position and a deployed position.

Figure 2B:
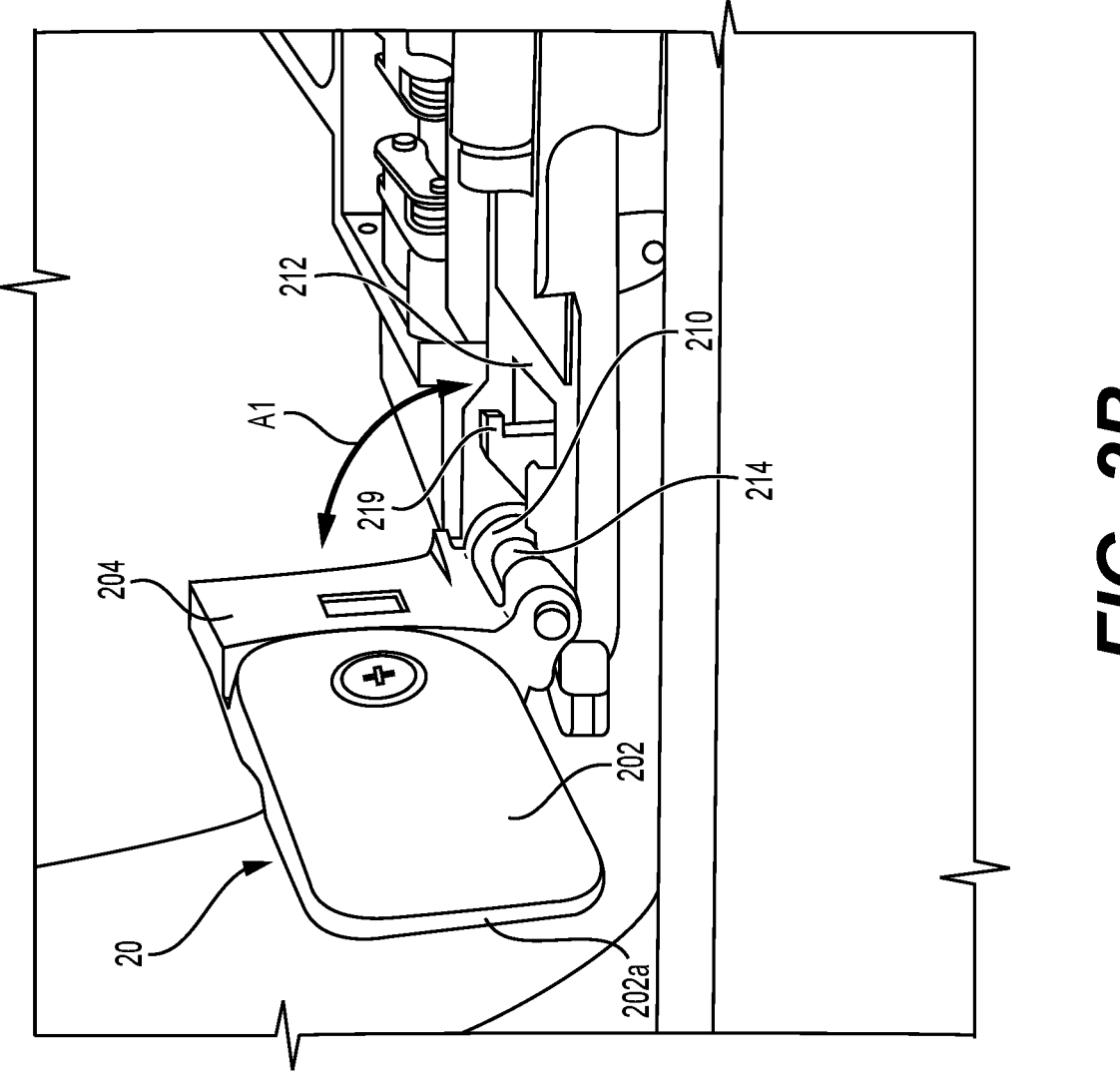
FIG. 2B shows another view of the side guide of FIG. 2A with the side guide in the deployed position.
Figure 2C:
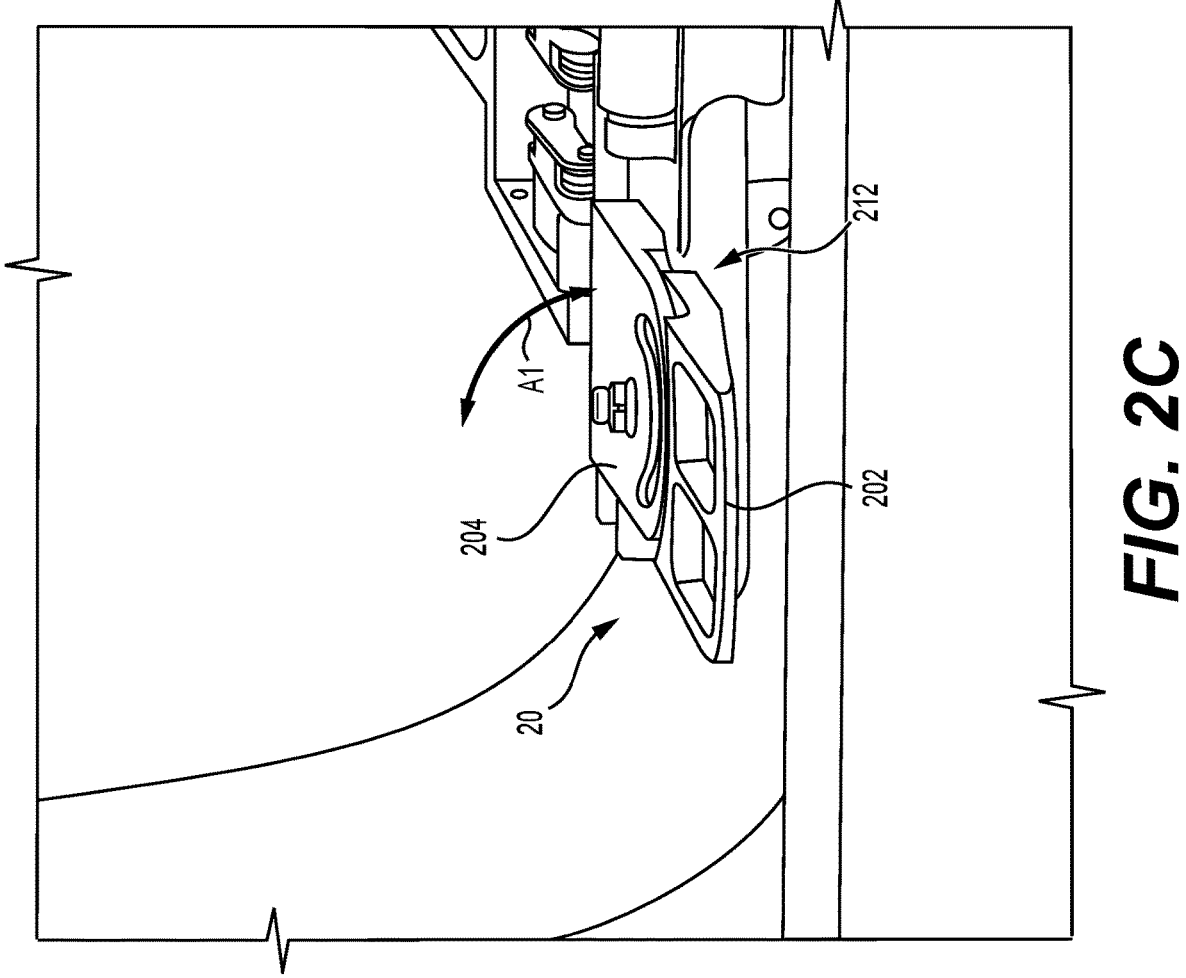
FIG. 2C shows another view of the side guide of FIG. 2A with the side guide in a stowed position.

FIG. 2B demonstrates the deployed position of side guide 20, while FIG. 2C demonstrates the stowed position of side guide 20. While stowed, the side guide 20 may remain extended outside of doorway 100 as shown in FIG. 2C until door sill extension 30 is rotated upwards and inwards. Mounting member 204 rotates about an arc A1 when moving between the deployed and stowed position. In embodiments, arc A1 lies in the XZ-plane as shown with coordinate reference R1 in the figures. Arc A1 may extend by about 90 degrees between the deployed and stowed positions. In the stowed position, mounting member 204 is parallel to the bottom of doorframe 102, while in the deployed position, mounting member 204 is perpendicular to the bottom of doorframe 102. In the stowed position, a catch 216 (see FIGS. 2D and 2E) extends upwardly through an opening 220 on mounting member 204 and is configured to hold side guide in the stowed position, as further described below. Catch 216 is disposed within a slot 218 of base 212 (see FIGS. 2D and 2E).

Contact member 202 is coupled to mounting member 204 via a pivot 206. Pivot 206 is for example a screw, bolt, pin, or other cylindrical member configured to enable contact member 202 to rotate relative to mounting member 204 on pivot 206 along an arc A2. In embodiments, arc A2 lies in the YZ-plane as shown with coordinate reference R1 in the figures. Second end 202*b* (see FIG. 2A) has a rounded shape to facilitate rotation of contact member 202 about pivot 206. Similarly, mounting member 204 has a curved portion configured to accept the rounded second end 202*b* for facilitating rotation of contact member 202.

Figure 2D:
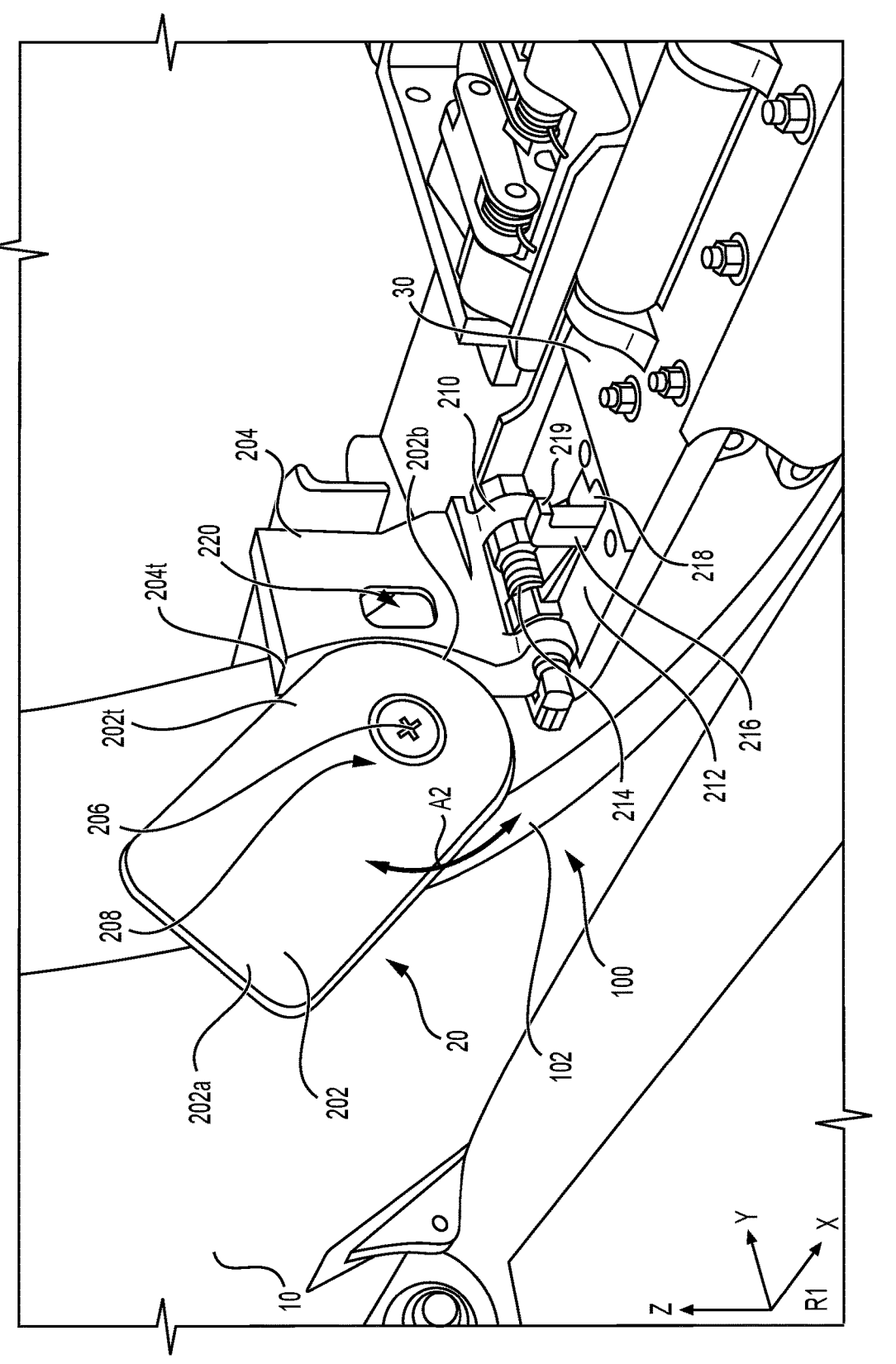
FIG. 2D shows the side guide of FIG. 2A with a contact member rotated upwards.
Figure 2E:
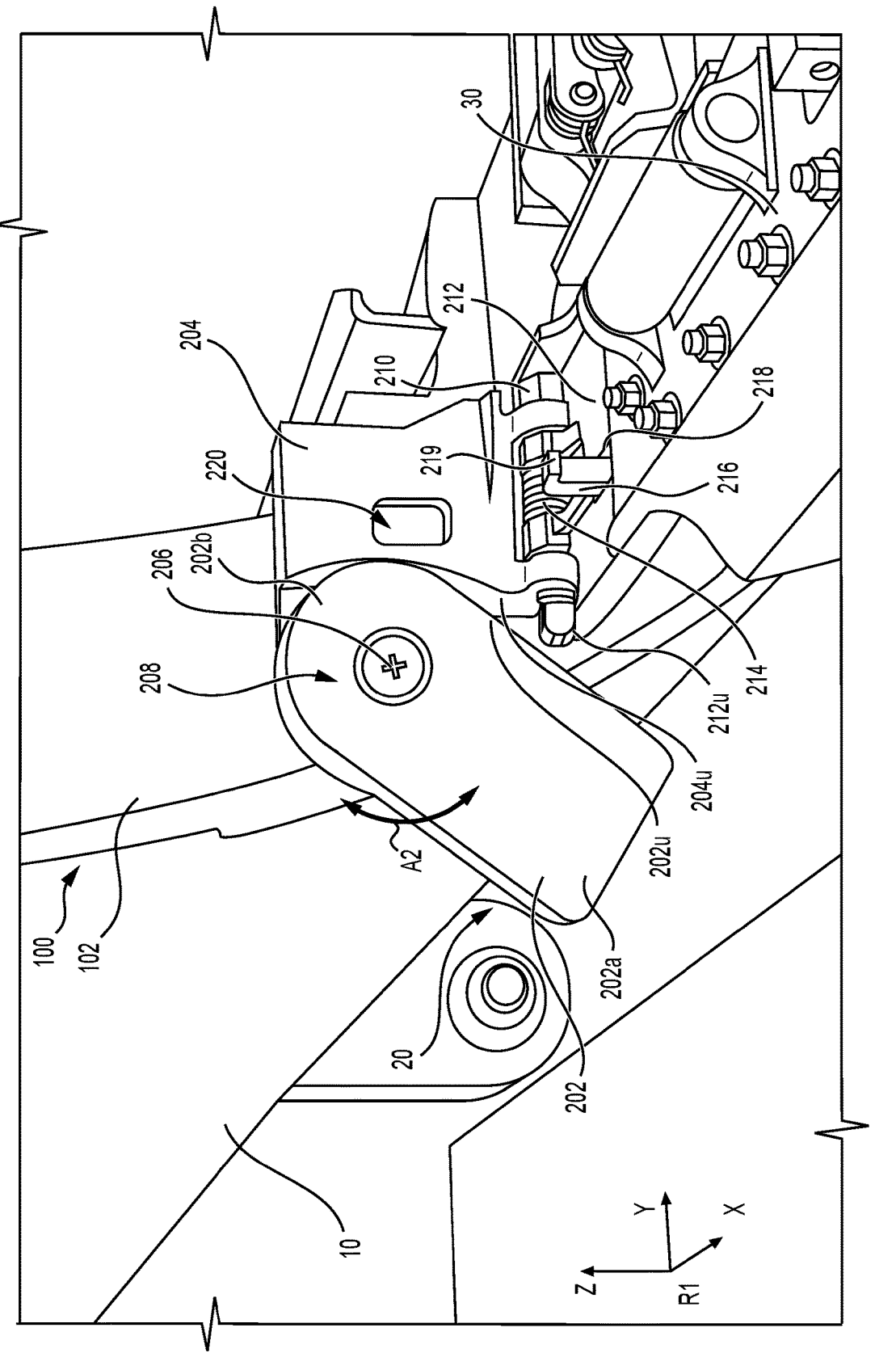
FIG. 2E shows the side guide of FIG. 2A with the contact member rotated downwards.
Figure 4:
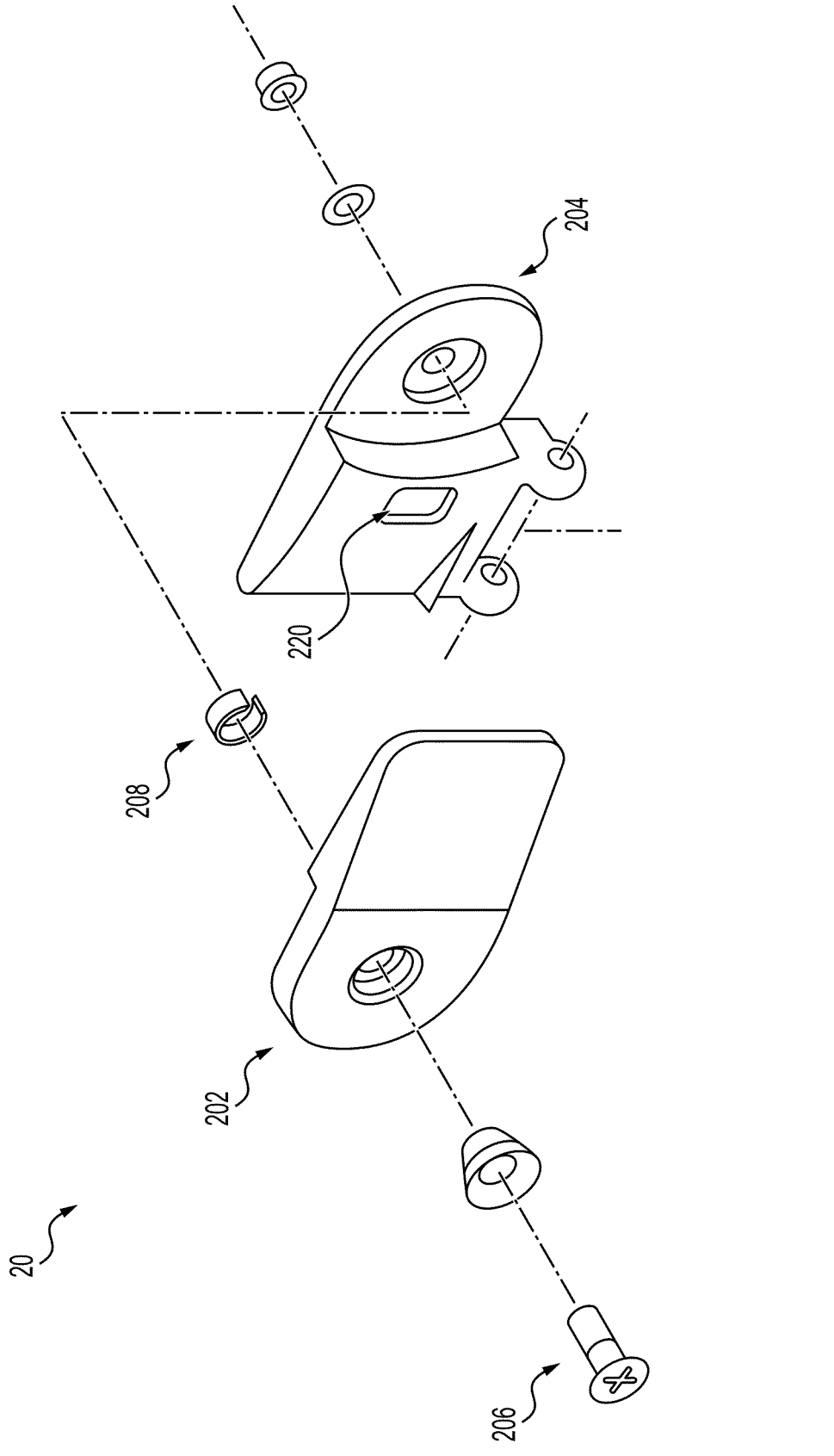
FIG. 4 shows an exploded view of the contact member and mounting member of the side guide of FIG. 2A.

In embodiments, contact member 202 is biased to a neutral position about pivot 206 by a biasing member as depicted in FIG. 2A. A contact member biasing member 208 may comprise a torsion spring or, as shown in FIG. 4, a leaf spring disposed on pivot 206, for example. An amount of force needed to rotate contact member 202 about pivot 206 may be increased via contact member biasing member 208. Contact member 202 may comprise limited rotation of the contact member 202 about pivot 206 beyond a predetermined amount. In some embodiments, an amount of rotation of contact member 202 along arc A2 may be limited by contact member biasing member 208. For example, contact member biasing member 208 may comprise a leaf spring that bottoms out to prevent further rotation. Alternatively, rotation of contact member 202 along arc A2 may be limited by contact between contact member 202 and another portion of side guide 20. Specifically, in the up direction, a top side 202t of contact member 202 may make contact with a top corner 204t of mounting member 204, as seen in FIG. 2D. In the down direction, an underside 202u of contact member 202 may make contact with an underside corner 204u of mounting member 204, as seen in FIG. 2E. In other embodiments, in the down direction, an underside 202u may contact an abutment 212u on base 212.

Contact member 202 is disposed substantially outside of doorway 100 so that any misaligned cargo 12 being moved into doorway 100 will touch contact member 202 before touching doorframe 102 or aircraft 10. Contact member 202 may then guide cargo 12 as it is moved into doorway 100. Specifically, the tapered first end 202a of contact member 202 assists with realigning cargo 12 as it is moved through doorway 100. By making initial contact with contact member 202, cargo 12 is prevented from touching doorframe 102 thereby preventing potential damage to aircraft 10.

As demonstrated in FIG. 2D, if cargo 12 is misaligned in the X-direction as it is raised to the level of doorway 100, loading equipment or cargo 12 may touch the bottom of contact member 202 as cargo 12 is raised. As contact member 202 is raised, it rotates upwardly along arc A2 about pivot 206 and compresses contact member biasing member 208. When contact member 202 is contacted, an operator loading cargo 12 may be alerted. For example, a cargo operator monitoring the cargo loading process may see that contact member 202 has rotated, or they may hear cargo 12 touch contact member 202, or they may hear contact member 202 creak as it rotates along arc A2. This will notify the operator that cargo 12 is not properly aligned for entry into doorway 100. The cargo operator may then stop the loading process and realign cargo 12 to avoid damage to aircraft 10. As misaligned cargo 12 is lowered back down from doorway 100, contact member 202 will reset to a level position as it rotates along arc A2 via contact member biasing member 208.

Alternatively, if an item were to touch contact member 202 from the top and push down on contact member 202, contact member 202 rotates downwardly via pivot 206 along arc A2, as shown in FIG. 2E. For example, while unloading cargo 12 from aircraft 10, the loading equipment or the cargo 12 itself may contact the top of contact member 202 as the cargo 12 is lowered off of aircraft 10. Following contact with contact member 202, contact member biasing member 208 resets contact member 202 back to the level position.

The position of contact member 202 also assists in the loading of cargo 12 into doorway 100 along the Y-direction as seen most clearly in FIG. 2A. If cargo 12 traveling along the Y-direction into doorway 100 is not aligned within the opening between opposing side guides 20, cargo 12 makes initial contact with contact member 202 before touching doorframe 102 or aircraft 10, thus preventing damage to aircraft 10. Contact member 202 may realign cargo 12 to guide it through doorway 100 if the cargo 12 is only slightly misaligned in the X-direction. Contact member 202 may be rotated up or down along arc A2, depending on contact made by cargo 12 in the Z-direction.

In operation, side guide 20 is deployed via mounting member biasing member 214 when catch 216 is released from opening 220. Side guide 20 is stowed by rotating mounting member 204 downwardly such that catch 216 engages opening 220 of mounting member 204 for securing mounting member 204 in the stowed orientation depicted in FIG. 2C. In embodiments, catch 216 comprises an extension 219 configured to hook over an outer edge surrounding the opening 220 for securing the mounting member in the stowed position as further described below.

Figure 3:
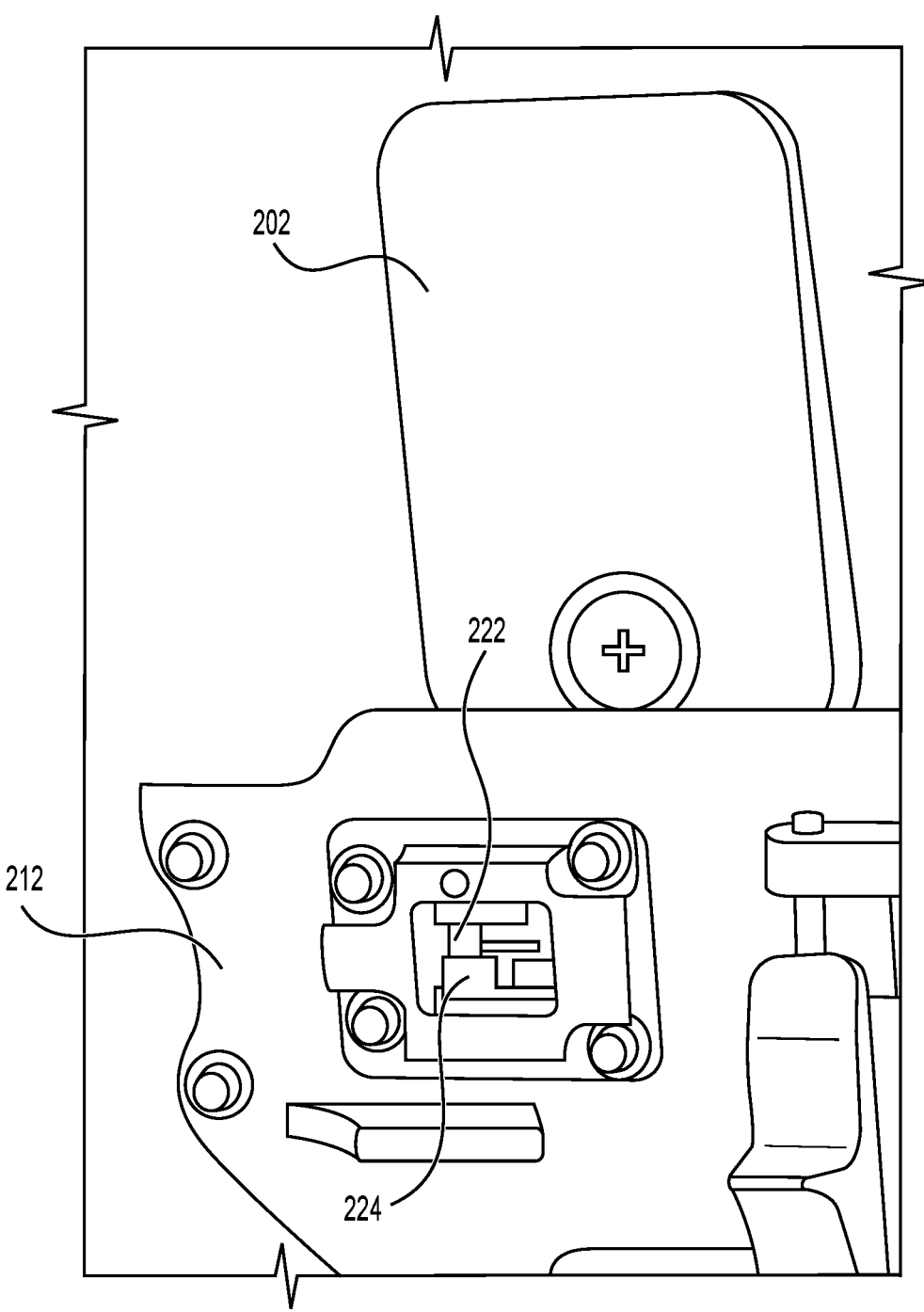
FIG. 3 shows an underside of a base of the side guide of FIG. 2A, in an embodiment.

FIG. 3 shows an underside of base 212 in which a catch biasing member 224 is viewable. Catch biasing member 224 is for example a torsion spring or leaf spring. Catch biasing member 224 may be disposed around a post 222 and configured to bias catch 216 into the stowed position for maintaining mounting member 204 in the stowed position. Specifically, when catch 216 passes through opening 220, extension 219 on a distal end of catch 216 rests on mounting member 204 and is secured thereto by catch biasing member 224. Catch 216 may be released from opening 220 by pressing on catch 216 to overcome catch biasing member 224 such that catch 216 may pass through opening 220 as mounting member 204 is raised via mounting member biasing member 214.

When side guide 20 is installed on door sill extension 30, as described above, door sill extension 30 may pivot upwardly into doorway 100, which raises side guide 20 upwardly into doorway 100 to enable the door to be closed.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A doorway side guide system, comprising:
a base mechanically coupled with a bottom portion of a doorway;
a mounting member rotatably coupled to the base via a hinge for rotating between a deployed position and a stowed position;
a mounting member biasing member operatively coupled to the hinge for biasing the mounting member into the deployed position; and
a contact member mechanically coupled with the mounting member via a pivot, the contact member being configured to rotate about the pivot,
wherein the contact member extends outside of the doorway in the deployed position for guiding cargo through the doorway and for protecting a doorframe of the doorway.

2. The system of claim 1, wherein the mounting member biasing member comprises a torsion spring disposed on the hinge such that the mounting member is rotated substantially upright via the mounting member biasing member into deployed position.

3. The system of claim 1, wherein the pivot is configured to enable the contact member to rotate upwards and downwards relative to the mounting member when the mounting member is in the deployed position.

4. The system of claim 3, wherein the contact member comprises a spring disposed on the pivot to bias the contact member in a neutral position.

5. The system of claim 4, wherein the spring disposed on the pivot is a leaf spring.

6. The system of claim 3, wherein the contact member comprises a limited rotation of the contact member beyond a predetermined amount.

7. The system of claim 1 comprising a catch that extends upwardly through an opening in the mounting member, wherein the catch is configured to releasably hold the mounting member in the stowed position.

8. The system of claim 7, wherein the catch comprises a catch biasing member configured to bias the catch such that the catch automatically secures the mounting member when the mounting member is rotated into the stowed position.

9. The system of claim 1, wherein the base remains inside the doorway while the contact member extends outside of the doorway in the deployed position.

10. A doorway side guide system, comprising:

a base fastened to a bottom portion of a doorway;

a mounting member rotatably coupled to the base via a hinge for rotating between a deployed position and a stowed position;

a contact member rotatably coupled with the mounting member via a pivot, the contact member being configured to rotate upwards and downwards about the pivot; and a spring disposed about the pivot, wherein the spring is configured to bias the pivot in a neutral orientation such that the contact member returns to the neutral orientation following upwards or downwards rotation of the contact member, wherein the contact member extends outside of the doorway in the deployed position for guiding cargo through the doorway and for protecting a doorframe of the doorway.

11. The system of claim 10, wherein the contact member comprises a physical limit configured to limit rotation of the contact member, wherein the physical limit comprises:

a top side of the contact member is configured to contact a top corner of the mounting member during upwards rotation; and an underside of the contact member is configured to contact an underside corner of the mounting member during downwards rotation.

12. The system of claim 10, wherein the mounting member comprises an opening configured to receive a catch, wherein the catch is configured to secure the mounting member against the base in the stowed position.

* * * * *